Aug. 23, 1966 H. LUDWIG 3,267,520
APPARATUS FOR INJECTING PLASTIC OR RUBBER SOLES TO SHOE UPPERS
Filed Nov. 17, 1964

INVENTOR.
Herbert Ludwig
BY
Roberts, Cushman & Grover
ATT'YS

3,267,520
APPARATUS FOR INJECTING PLASTIC OR RUBBER SOLES TO SHOE UPPERS
Herbert Ludwig, Desmastrasse 112, Uesen, near Bremen, Germany
Filed Nov. 17, 1964, Ser. No. 411,924
Claims priority, application Germany, Nov. 27, 1963, L 46,427
11 Claims. (Cl. 18—17)

This invention relates to the manufacture of shoes by injection molding of a bottom to an upper and particularly of apparatus of the kind wherein there is provided, in combination, a split mold ring open at the top and bottom, a last for supporting an upper against the open top and a sole plate movable through the open bottom relative to the bottom of the support last for controlling the size of the mold cavity and hence the thickness of the bottom to be attached to the upper and applying after-pressure to the bottom following injection to insure adhesion.

It is desirable to apply a relatively low pressure during injection of the bottom-forming composition into the mold cavity to avoid having to use excessive pressure between the lasted upper and the top of the mold ring to prevent leakage and damage to the upper, and yet a high pressure must be applied immediately after injection to insure a satisfactory bond. This has been achieved heretofore, but not entirely satisfactorily, with apparatus in which the sole plate was adjustably connected to a double-acting piston, both surfaces of which were loaded with pressure, and by using a reducing valve for applying different pressures to the opposite sides of the piston.

The object of this invention is to improve on apparatus of the foregoing kind and is characterized by employing two movable pistons with piston surfaces of different size to which pressure is supplied in such fashion as to load the smaller piston during the injection process and the larger piston upon termination of the injection process, thereby to obtain the low and high pressures desired without having to vary the pressure from the pressure source and hence without having to employ reduction valves. Other objects are to simplify the apparatus and improve its accuracy and reliability by employing a single source of constant pressure and by eliminating reducing valves. Further objects are to provide apparatus by means of which inserts may be applied prior to injection; to provide for terminating injection independently of the thickness of the bottom as soon as the predetermined pressure is exceeded; and to provide for adjusting the thickness of the bottom.

As herein illustrated, the foregoing is achieved by connecting the sole plate to a piston rod and mounting two pistons of different size in tandem on the rod in such fashion that by introducing pressure between the pistons a low-pressure may be applied by way of the smaller pistons to the rod and hence to the sole plate, to hold the latter at a predetermined level in the mold cavity for injection and that by venting the pressure between the pistons and introducing it to the other side of the larger piston a higher pressure may be applied by way of the larger piston to the rod and hence to the sole plate to apply an after-pressure to insure adhesion. The pistons are contained in a cylinder having heads at its ends. The smaller piston projects through an opening in one of the heads of the cylinder and the larger piston is retained in the cylinder between the smaller piston and the other head. A bracket member supports a spacer sleeve fixed at one end to the sole plate with its other end opposite the smaller piston, and there is an adjustable part on the rod between the spacer sleeve and the smaller piston, operative to adjust the smaller piston relative to the larger piston and to transmit the movement of the smaller piston to the sole plate. A second adjustable part mounted on the spacer provides for adjusting the overall movement of the pistons in unison relative to the mold ring. A switch operated by displacement of the sole plate and hence the rod when a predetermined pressure is reached provides for terminating the injection when the pressure exceeds a predetermined amount. A valve connects the space between the pistons and the space beneath the larger piston to a source of constant pressure, the valve having two positions, one position to supply the pressure to the space between the pistons to apply a low pressure to the platen and in the other position to the lower side of the larger piston to apply a high pressure to the platen.

The invention will now be described in greater detail in reference to the accompanying drawings, in which.

Figure 1:
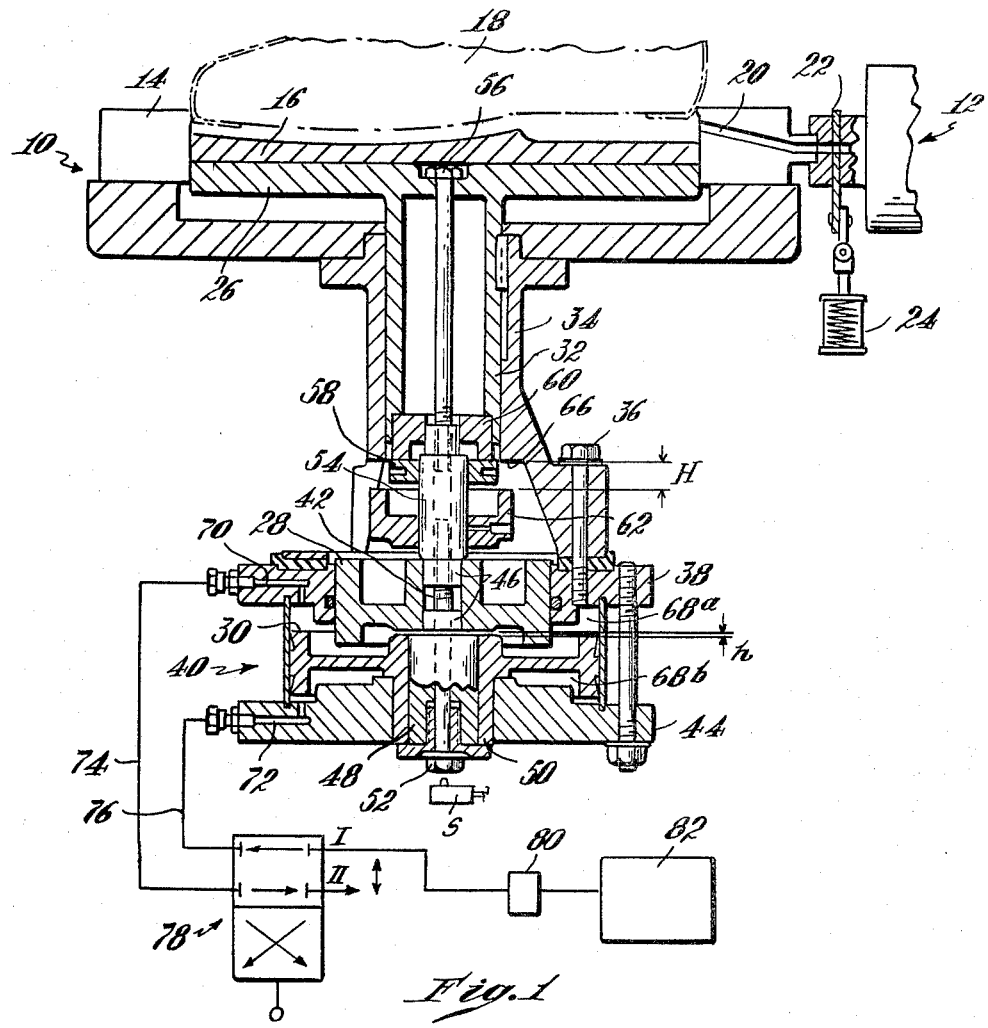
FIG. 1 shows a vertical section of the injection apparatus in a position for injection with a pressure source and conductor for supplying pressure to the apparatus illustrated diagrammatically.

The apparatus comprises a multi-part mold 10 and an injection unit 12. Usually a plurality of molds 10 are mounted on a turntable for movement about a predetermined axis relative to the injection unit, so as to enable aligning successive molds with the injection unit. Optionally there may be several injection units so that different kinds of bottom-forming composition may be employed from time-to-time, or for a different shoe-making operation.

The mold assembly is comprised of a two-part split ring 14, a sole plate 16, supported at the lower side of the ring, and a last 18, adapted to be supported at the upper side of the ring to hold an upper mounted on the last in spaced relation to the sole plate to provide a mold cavity into which may be injected a bottom-forming composition for attachment to the upper. To this end the mold part contains feed channels (one-half in each of the parting faces of the mold ring) through which the bottom forming composition is injected from the injection apparatus 12. As shown, the injection apparatus embodies a cut-off valve 22 operable, by means of a solenoid 24, to control the flow of the bottom-forming composition to the mold.

The sole plate 16, is movable vertically in the mold ring and is supported for this purpose on a platen 26, which is movable vertically by two pistons 28 and 30. The platen 26 for this purpose has at its underside an integral hollow sleeve 32 slidable in a hollow bracket member 34, the latter ring fastened by bolts 36 to the upper head 38 of a cylinder 40 containing the pistons 28 and 30. The pistons 28 and 30 are loosely mounted within the cylinder 40 on a rod 42 with one end of the piston 28 extending through the upper head 38 and with the other piston 30 situated between the piston 28 and the lower head 44 of the cylinder. Bearings 46 on the rod slidably support the piston 28 and a bearing 48 slidably supports the piston 30. The piston 30 has a hub 50 extending from its lower side through the lower head 44. The bearing 48 extends through the hub and a retainer nut 52 fastened to the lower end of the rod 42 against the end of the hub 50, holds the pistons 28 and 30 on the rod between it and a part 54 secured to the rod. The rod 42 extends from the part 54 through the sleeve 32 and is secured to the platen 26 by a head 56 recessed into its upper surface. An adjustable nut 58 is threaded onto the part 54 and by engagement with the lower end of a spacer part 60, the upper part of which is engaged with the lower end of the sleeve 32, holds the sole plate at a predetermined position relative to the small piston 28. By rotating the adjusting nut 58, a clearance may be obtained between the pistons which enables downward displacement of the smaller piston toward the larger piston a small amount and hence downward movement of the piston rod so that such movement may be employed to terminate injection. A second adjustable nut 62 threaded on the part 54 by engagement with a shoulder 66 on the bracket limits the upward movement of the pistons in unison vertically with respect to the mold ring during the application of the high pressure. Downward movement is limited by control of the hub of the piston 30 with the lower head 44 of the cylinder. The rod 42 is divided between its ends and threaded into the part 54 thereby enabling adjusting the effective length of the rod.

The two pistons 28 and 30 divide the cylinder into two chambers, to wit, a chamber 68a between the pistons and a chamber 68b below the larger piston 30. A passage 70 in the upper head 38 provides for supplying pressure to the chamber 68a and a passage 72 in the lower head 44 provide or supplying pressure to the chamber 68b. The passages 70 and 72 are connected by pipes 74 and 76, a three-way valve 78 and a pressure reducer 80 to a source 82 of constant pressure.

The apparatus as described above may be employed to apply a bottom forming composition directly to the lasting margin of an upper lasted to a last, for example by string lasting, or by the use of an insole, or to the making of a shoe in which a filler is employed at the forepart and heel, for example, felt pads.

Figure 2:
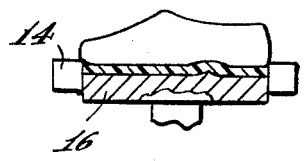
FIG. 2 is a vertical section showing the apparatus used to apply a bottom-forming composition directly to an upper.

When applying the bottom directly to the lasted upper as shown in FIG. 2, the valve 78 is shifted to the No. I position to permit pressure fluid to flow through the pipe 74 and passage 70 to the chamber 68a between the pistons. This pressure seats the larger piston 30 against the lower head 44 and raises the smaller piston 28 relative to the larger piston 30 which in turn through the part 54, adjustable nut 58 and spacer 60 raises the sleeve 32 and hence the platen 26 to the position shown so that the sole plate 16 occupies a predetermined position below the underside of the lasted upper, there being at this position a small clearance or space h between the adjacent faces of the hubs of the two pistons. This clearance h may, of course, be adjusted by means of the adjusting nut 58. Injection is now made through the injection passage 20 until the space in the mold between the bottom of the lasted upper and the upper surface of the sole plate is filled. When the pressure exceeds a predetermined amount it will displace the sole plate downwardly by the amount of the clearance h and this in turn will displace the rod 42 downwardly and by contact with a switch S at the lower end of the rod will terminate the injection. Such termination of the injection is thus independent of the thickness of the bottom that is being attached at any given time. Following injection the valve 78 is shifted to the No. II position which vents the pressure from the chamber 68a and supplies it through the conductor 76 to the chamber 68b thereby raising the large piston 30 and the small piston 28 in unison therewith so as to elevate the entire piston assembly including the rod 42, platen 26 and the sole plate 18 through a distance H or some such distance, depending upon the position of the adjustable nut 62 on the part 54. The higher or after-pressure is maintained at the underside of the piston 30 until polymerization is completed whereupon the pressure is vented by shifting the valve back from the No. II position to the No. I position.

Figure 3:
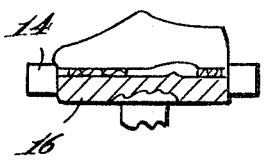
FIG. 3 is a vertical section showing the apparatus used to attach a filler pad at the forepart and heel end prior to injection of the bottom-forming composition.
Figure 4:
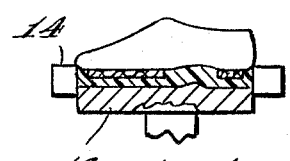
FIG. 4 is an elevation of the apparatus showing the application of the bottom following attachment of the filling pad tot he forepart and heel end.

The apparatus is particularly useful in making shoes wherein a filler insert in the form of a felt pad is employed at the forepart and heel as shown in FIGS. 3 and 4. When including a filler at the forepart of the heel the inserts are coated with adhesive and placed on the upper surface of the sole plate. The lasted upper is now held against the rim of the mold and the valve 78 is moved to the No. II position to apply a pressure to the underside of the larger piston 30 thereby to raise the piston assembly and platen so as to press the adhesive coated inserts against the bottom of the lasted upper as shown in FIG. 3. The valve is then shifted to the No. I position to vent the chamber 68b and supply pressure to the chamber 68a so as to lower the platen to the position shown in FIG. 4, to provide a space between the lower side of the attached inserts and the sole plate for the injection of the bottom-covering composition. Injection is now effected until the pressure displaces the sole plate downwardly and hence the rod 42 sufficiently to actuate the cutoff switch S whereupon the valve is again shifted to the No. II position to apply the after-pressure necessary to provide a good bond between the outsole and the upper.

It should be understood that the present disclosure is for the purpose of illustration only and this invention includes all modifications and equivalents which fall within the scope of the appended claims.

I claim:

1. Apparatus for making shoes by injection molding comprising a sole plate, a mold ring with which the sole plate is associated in such fashion as to form with a last supported against the top of the mold ring a bottom-forming cavity into which may be injected a bottom-forming composition for attachment to the bottom of an upper assembled on the last, and means for moving the sole plate relative to the bottom of the last to position the sole plate for injection and after injection to apply an increased pressure: said means comprising a rod, means at one end of the rod adapted to support the sole plate, a first piston loose on the rod operable to raise the sole plate to a predetermined position relative to the mold ring, and to sustain said sole plate at said predetermined position up to a predetermined injection pressure, a second piston loose on the rod situated below the first piston operable to apply an increased pressure to the sole plate at said predetermined position, and means for supplying from a single source of constant pressure, pressure first to the first piston and then to the second piston.

2. Apparatus for making shoes by injection molding comprising a sole plate, a mold ring with which the sole plate is associated in such fashion as to form with a last supported against the top of the mold ring a bottom-forming cavity into which may be injected a bottom-forming composition for attachment to the bottom of an upper assembled on the last, and means for moving the sole plate relative to the bottom of the last to position a sole plate for injection and after injection to apply an increased pressure: said means comprising a cylinder, a rod supported in the cylinder with an end projecting therefrom, means adapted to support the sole plate on the projecting end of the rod, a piston in the cylinder loose on the rod, means on the rod between the piston and the sole plate operable by elevation of the piston in the cylinder to elevate the sole plate, a second piston in the cylinder loose on the rod below the first piston and tandem therewith, said second piston being operable to elevate the first piston and in turn to elevate the sole plate, and means for supplying pressure from a single source of pressure first to the first piston to elevate the sole plate and then to the second piston to apply increased pressure to the sole plate at said elevated position.

3. Apparatus for making shoes by injection molding comprising a sole plate, a mold ring with which the sole plate is associated in such fashion as to form with a last supported against the top of the mold ring a bottom-forming cavity into which may be injected a bottom-forming composition for attachment to the bottom of an upper assembled on the last, and means for moving the sole plate relative to the bottom of the last to position the sole plate for injection, and after injection to apply an increased pressure: said means comprising a cylinder, a rod supported with the cylinder with one end projecting therefrom, means supporting the sole plate at the end of the projecting rod, a piston in the cylinder loose on the rod, a spacer member on the rod having a part bearing on the piston and a part bearing on the sole plate operative by movement of the piston in the cylinder to effect elevation of the sole plate, and to hold the same at a predetermined level up to a predetermined injection pressure, and a second piston loose on the rod below the first piston, said second piston being of larger diameter than the first piston, and being operable to elevate the first piston on the rod and hence the sole plate, a means for supplying pressure from a single source pressure first between the pistons to effect elevation of the smaller piston and then to the lower side of the larger piston while venting pressure from between the pistons to apply increased pressure to the sole plate at said predetermined elevation.

4. Apparatus for making shoes by injection molding comprising a sole plate, a mold ring with which the sole plate is associated in such fashion as to form with a last supported against the top of the mold ring a bottom-forming cavity in which may be injected a bottom-forming composition for attachment to the bottom of an upper assembled on the last, and means for moving the sole plate relative to the bottom of the last to position the sole plate for injection, and after injection to apply an increased pressure: said means comprising a cylinder, a rod supported in the cylinder with an end projecting therefrom, a platen secured to the extending end of the rod for supporting a sole plate, a piston in the cylinder loose on the rod, said piston having a part extending through the end of the cylinder, a part fixed to the rod with an end bearing on the part of the piston extending from the cylinder, an adjustable nut on said part movable axially thereon by rotation, a spacer mounted between the platen and the nut, operable to transmit movement of the piston by way of the part fixed to the rod and the nut to the platen, a larger piston in the cylinder loose on the rod, said larger piston being situated below the first piston and operable to raise the first piston in the cylinder, and means operative in one position to supply pressure to the cylinder between the pistons and in another position to supply the same pressure to the cylinder below the larger piston, said nut being adjustable to provide a clearance between the pistons of a predetermined amount when the pressure is supplied to the cylinder between said pistons.

5. Apparatus according to claim 4 comprising an injection cut-off switch operable by downward displacement of the first piston when the injection pressure exceeds a predetermined amount to actuate said cut-off switch.

6. Apparatus according to claim 4 comprising an injection cut-off switch situated below the rod in a position to be actuated by downward displacement thereof when the injection pressure exceeds a predetermined amount.

7. Apparatus for making shoes by injection molding comprising a sole plate, a mold ring with which the sole plate is associated in such fashion as to form with a last supported against the top of the mold ring a bottom-forming cavity into which may be injected a bottom-forming composition for attachment to the bottom of an upper assembled on the last, and means for moving the sole plate relative to the bottom of the last to position the sole plate for injection, and after injection to apply an increased pressure; said means comprising a cylinder, a rod supported in the cylinder with an end projecting therefrom, a platen secured to the end of the rod for supporting a sole plate, a piston in the cylinder loose on the rod, said piston having a part extending through the end of the cylinder, a part fixed to the rod, said part having an end engaged with the projecting portion of the piston, a nut threaded on said part, a spacer extending from the sole plate into engagement with the nut, said piston being operable through said part, nut and spacer to elevate the sole plate, a larger piston in the cylinder loose on the rod, said larger piston being situated beneath the first piston and being operable to raise the latter, and means having two positions, one in which it supplies pressure to the cylinder between the pistons to elevate the first piston independently of the larger piston and a second position in which it supplies pressure to the cylinder below the larger piston to elevate both pistons, and adjustable means on the rod operable to limit elevation of the pistons in unison.

8. Apparatus for making shoes by injection molding comprising a sole plate, a mold ring with which the sole plate is associated in such fashion as to form with a last supported against the top of the mold ring a bottom-forming cavity into which may be injected a bottom-forming composition for attachment to the bottom of an upper assembled on the last, and means for moving the sole plate relative to the bottom of the last to position the sole plate for injection and after injection to apply an increased pressure; said means comprising a cylinder, a piston rod supported in the cylinder with an end projecting therefrom, means at one end of the rod adapted to support a sole plate, a first piston loose on the rod operative to raise the sole plate to a predetermined position relative to the mold ring and to sustain said sole plate at that position up to a predetermined pressure, a second piston loose on the rod situated below the first piston operative to apply an increased pressure to the sole plate at said predetermined level, and means for supplying pressure from the source of constant pressure first to the first piston and then to the second piston.

9. Apparatus for making shoes by injection molding comprising a sole plate, a mold ring with which the sole plate is associated in such fashion as to form with a last supported against the top of the mold ring a bottom-forming cavity into which may be injected a bottom-forming composition for attachment to the bottom of an upper assembled on the last, and means for moving the sole plate relative to the bottom of the last to position the sole plate for injection and after injection to apply an increased pressure; said means comprising a cylinder having heads at its opposite ends containing holes, a rod supported in said cylinder with one end projecting through the hole in one head, means on the projecting end of the rod supporting the sole plate at the lower side of the mold ring, a first piston in the cylinder loose on the rod, said piston having a part concentric with the rod projecting through the hole in said one head, a second piston of larger diameter in the cylinder loose on the rod in tandem with the first piston, said second piston having a part concentric with the rod and extending through the hole in the other head, a bearing sleeve, a bracket secured to the one head supporting the bearing sleeve with its axis concentric with the axis of the rod, a bearing slide secured to the underside of the means supporting the sole plate, said bearing slide being mounted in the bearing sleeve and being movable axially therein, spacer means situated between the lower end of the bearing slide and the part of the first piston projecting through the hole in the one head for transmitting movement of the first piston to the bearing slide, and thence to the sole plate, means providing a source of constant pressure and a valve operable to connect the pressure source alternatively to the cylinder between the pistons and to the cylinder below the larger piston.

10. Apparatus according to claim 9 comprising adjustable spacer means situated between the lower end of the bearing slide and the part of the piston projecting through the hole in said one head to shorten the effective distance between the bearing slide and the part of the piston projecting through the hole in said one head.

11. Apparatus according to claim 9 comprising an abutment on the bracket and adjustable means on the spacer movable axially therealong, said means being operable by engagement with said abutment to limit elevation of the sole plate relative to the mold ring.

References Cited by the Examiner
UNITED STATES PATENTS 3,012,278  12/1961  Szerszynski _____ 18—17
3,018,517  1/1962   Ludwig _____ 18—17

FOREIGN PATENTS 1,061,064  12/1959  Germany.

J. SPENCER OVERHOLSER, *Primary Examiner.*

W. L. McBAY, *Assistant Examiner.*